(12) United States Patent
Sloo

(10) Patent No.: US 7,840,344 B2
(45) Date of Patent: Nov. 23, 2010

(54) ACCESSING CONTENT VIA A GEOGRAPHIC MAP

(75) Inventor: David Sloo, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 757 days.

(21) Appl. No.: 11/705,285

(22) Filed: Feb. 12, 2007

(65) Prior Publication Data

US 2008/0195308 A1   Aug. 14, 2008

(51) Int. Cl.
   *G06F 3/048* (2006.01)
(52) U.S. Cl. .................. 701/208; 715/716; 715/764
(58) Field of Classification Search .............. 701/208; 715/204, 205, 206, 716, 835, 764, 848
   See application file for complete search history.

(56) References Cited

U.S. PATENT DOCUMENTS

| | | | |
|---|---|---|---|
| 5,708,845 A | 1/1998 | Wistendahl et al. | |
| 6,362,840 B1 | 3/2002 | Burg et al. | |
| 6,363,392 B1* | 3/2002 | Halstead et al. | 707/102 |
| 6,549,922 B1 | 4/2003 | Srivastava et al. | |
| 6,711,464 B1 | 3/2004 | Yap et al. | |
| 6,714,215 B1 | 3/2004 | Flora et al. | |
| 6,728,708 B1 | 4/2004 | Yotka et al. | |
| 7,007,228 B1 | 2/2006 | Carpo | |
| 7,062,712 B2 | 6/2006 | Schneider et al. | |
| 7,224,365 B1* | 5/2007 | Seideman et al. | 345/473 |
| 7,574,530 B2* | 8/2009 | Wang et al. | 709/245 |
| 7,606,875 B2* | 10/2009 | Xie et al. | 709/218 |
| 2001/0011270 A1* | 8/2001 | Himmelstein et al. | 707/3 |
| 2002/0054134 A1 | 5/2002 | Kelts | |
| 2004/0078750 A1* | 4/2004 | Frank | 715/500 |
| 2005/0097451 A1 | 5/2005 | Cormack et al. | |
| 2005/0149969 A1 | 7/2005 | Kumar et al. | |
| 2005/0240596 A1 | 10/2005 | Worthen et al. | |
| 2006/0004752 A1* | 1/2006 | Harel et al. | 707/6 |
| 2006/0146029 A1 | 7/2006 | Diercks | |
| 2006/0197763 A1* | 9/2006 | Harrison et al. | 345/441 |
| 2007/0011150 A1* | 1/2007 | Frank | 707/4 |
| 2007/0016580 A1* | 1/2007 | Mann et al. | 707/6 |
| 2007/0112777 A1* | 5/2007 | Field et al. | 707/10 |
| 2007/0198951 A1* | 8/2007 | Frank | 715/838 |
| 2007/0219968 A1* | 9/2007 | Frank | 707/3 |

(Continued)

FOREIGN PATENT DOCUMENTS

JP 2005-056075 A2 3/2005
WO WO 2006058371 A1 6/2006

OTHER PUBLICATIONS

Verhoeven et al., "Hypermedia on the Map" Int. Conf. on Information, Communications, and Signal processing, Sep. 9-12, 1997.*

(Continued)

*Primary Examiner*—Khoi Tran
*Assistant Examiner*—Brian J Broadhead

(57) ABSTRACT

Detailed herein is a technology which, among other things, allows multimedia content associated with a particular geographic area to be viewed and accessed through an appropriate geographic map. In one approach to this technology, multimedia content is received. This content has an associated geographic tag. A geographic map is displayed, and can be used to gain access to the multimedia content.

18 Claims, 9 Drawing Sheets

Flowchart 700

U.S. PATENT DOCUMENTS

| | | | |
|---|---|---|---|
| 2008/0010605 A1* | 1/2008 | Frank | 715/765 |
| 2008/0177793 A1* | 7/2008 | Epstein et al. | 707/104.1 |
| 2008/0195308 A1* | 8/2008 | Sloo | 701/208 |
| 2008/0270366 A1* | 10/2008 | Frank | 707/3 |
| 2009/0119255 A1* | 5/2009 | Frank et al. | 707/3 |

OTHER PUBLICATIONS

Ralha et al., "Hypermap: A System to Map the Web", Proceedings of the Int. Conf. on Next Generation Web Services practices, 2005.*

Kraak et all., "Principles of Hypermaps", Computers and Geosciences, vol. 23 pp. 457-464, 1997.*

Marchese, Francis, "Dynamically Binding Image to Text for information Communciation" Proceedings of the 8$^{th}$ Int. Conf. on Information Visualization, 2004.*

Toyama et al., "Geographic Location tags on Digital Images", Internatioanl Multimedia Conference, pp. 156-166, 2003.*

Hansen et al., "Integrating the Web and the World: Contextual Trails on the Move". ACM Conf. on Hypertext and Hypermedia, 2004, pp. 98-107.*

Signore et al., "A Distibuted Hypermedia on Archaelogy in Tuscany", Multimedia Computing and Museums, pp. 1-18, 2005.*

Arbeeny, Steele G., "Navigating Media Using Virtual Environments", Date: Jan. 2003, http://www.caip.rutgers.edu/~arbeeny/dissert.pdf.

Mazalek et al., "Sharing and Browsing Media on a Digital Tabletop", http://alumni.media.mit.edu/~matt/cv/tviews_carpe_03.pdf.

Pinzon et al., "Designing an Experiential Annotation System for Personal multimedia Information Management", http://scholar.google.com/scholar?hl=en&lr=&scoring=r&q=cache:LwIEfpdowAEJ:tintin.sfsu.edu/twiki/pub/Main/EvitaeGroup/IASTEDGCI2005.
pdf+Designing+An+Experimental+Annotation+System+For+Personal+multimedia+Information+Management.

Toyama et al., "Geographic location tags on digital images", Date: 2003, pp. 156-166, ACM Press, new York, US, http://portal.acm.org/citation.cfm?id=957046&dl=ACM&coll=GUIDE&CFID=11111111&CFTOKEN=2222222.

International Search Report for PCT Application No. PCT/US2008/050448 mailed Apr. 21, 2008, 2 pages.

* cited by examiner

Computing System Environment 10

GUI 200

GUI 250

Flowchart 300

Search System 400

ACCESSING CONTENT VIA A GEOGRAPHIC MAP

BACKGROUND

With the continued growth of the Internet, and the increasing permeation of content-generating devices in society, the sheer amount of multimedia content available is staggering. Mobile telephones, for example, allow easy generation of digital photographs or videos in almost any environment; desktop computers and readily-available software allow almost anyone to create movies and post them online. Meanwhile, more traditional media outlets, such as newspapers, radio stations, and television stations, are making their content increasingly available through digital distribution channels as well.

Search engines and social networking sites provide some means to find this content, as well as motivating additional content creation. However, while the means and opportunity for making content has been increasingly available, few advances have been made in presenting this wealth of content to a user, in any manner beyond than a simple list.

SUMMARY

Detailed herein is a technology which, among other things, displays content in the context of a geographic map. When content is received, access to the content can be enabled through interaction with an appropriate geographic map.

In one approach to this technology, multimedia content with an associated geographic tag is received. The geographic tag is used to select an appropriate geographic map for that content. Access to that content can then be obtained through interaction with the geographic map.

In another approach to this technology, a system for displaying content is described as including a receiver, a geographic categorizer, a map generator, and a graphical user interface (GUI). The receiver receives multimedia content. The geographic categorizer examines a geographic tag associated with the multimedia content. The map generator uses the geographic tag to select an appropriate geographic tag. The GUI displays the map, and allows a displayed map to be used to access the multimedia content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE FIGURES

The accompanying drawings, which are incorporated in and form a part of this specification, illustrate embodiments and, together with the description, serve to explain the principles of the claimed subject matter:

DETAILED DESCRIPTION

Figure 1A:
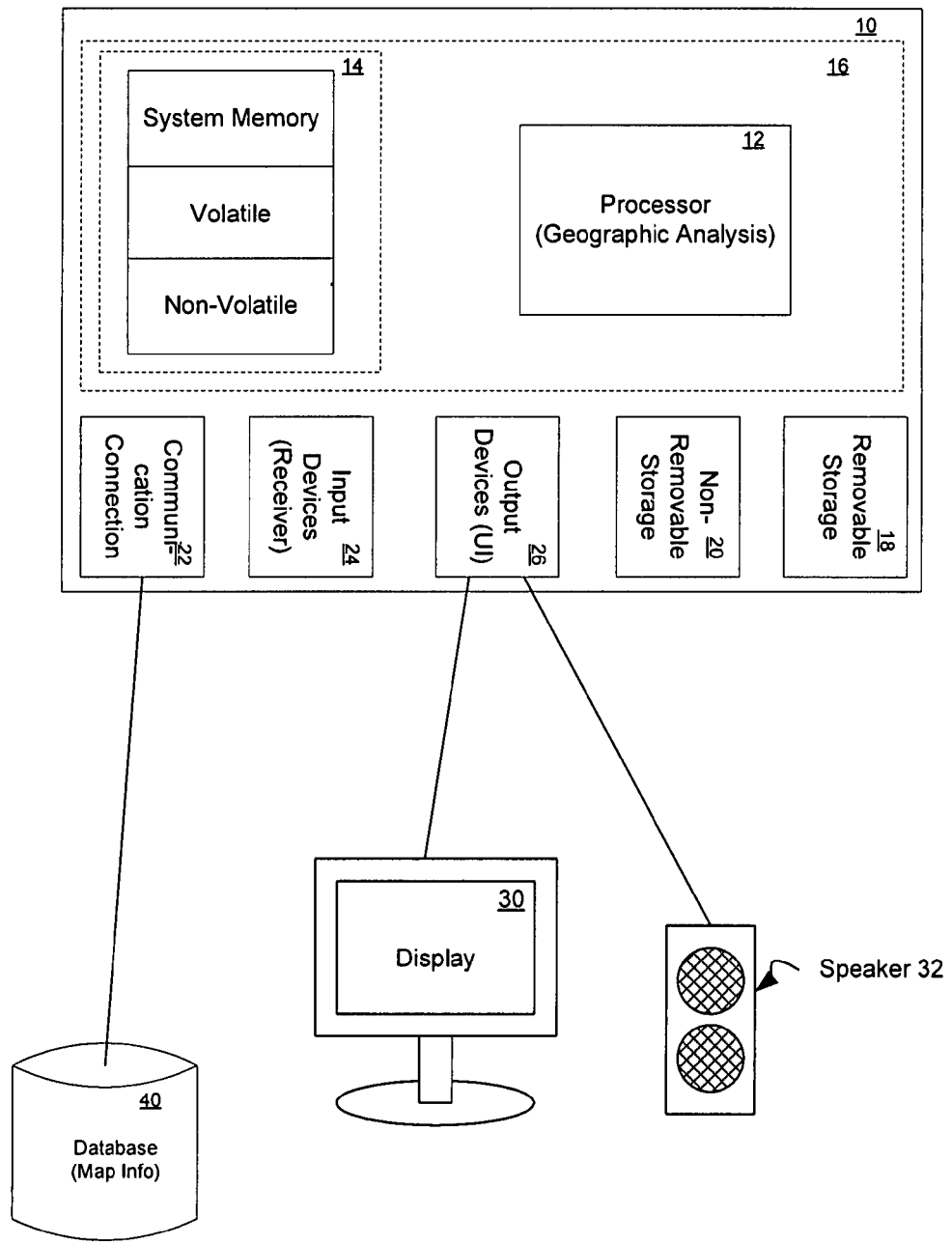
FIG. 1A is a block diagram of an exemplary computing system upon which embodiments may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 5) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system environment 10, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Vacation media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments. In light of the quantity of multimedia content available to anyone with Internet access, it would be useful to have more than just basic search engine results, e.g., a list, to help present that content. Moreover, the user experience can be enriched through new and different means of presenting information and access to multimedia content to the user.

Presented herein are embodiments of systems and methods of presenting or displaying electronic content. In several of these embodiments, electronic content, be it video, audio, web pages, text, or anything else, can be sorted geographically. This geographically sorted content can then be displayed as part of an interactive geographic map. As an example for purposes of illustration, and not as a limitation, a video created in Chicago, in Polish, about the Academy Awards in Los Angeles, might be accessible from a map of the world by clicking on Poland, for the language of the content, or maybe by clicking on Chicago, for the origin of content, or perhaps by clicking on Los Angeles, the geographical focus of the content. In the following descriptive exemplary embodiments, many different approaches to content presentation will be illustrated.

Basic Computing Device

With reference to FIG. 1, an exemplary system for implementing embodiments includes a general purpose computing system environment, such as computing system environment 10. In its most basic configuration, computing system environment 10 typically includes at least one processing unit 12 and memory 14. Depending on the exact configuration and type of computing system environment, memory 14 may be volatile (such as RAM), non-volatile (such as ROM, flash memory, etc.) or some combination of the two. This most basic configuration is illustrated in FIG. 1 by dashed line 16. Additionally, computing system environment 10 may also have additional features/functionality. For example, computing system environment 10 may also include additional storage (removable and/or non-removable) including, but not limited to, magnetic or optical disks or tape. Such additional storage is illustrated in FIG. 1 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and nonremovable storage 20 are all examples of computer storage media.

Computing system environment 10 may also contain communications connection 22 that allow it to communicate with other devices. Communications connection 22 is an example of communication media. Computing system environment 10 may also have input device(s) 24 such as a keyboard, mouse, pen, voice input device, touch input device, etc.

In some embodiments, computing system environment 10 may be connected to an output device 26, such as a display or monitor, or speakers. In several such embodiments, computing system environment 10 may be incorporated into a multimedia center, e.g., as a multimedia computer, or integrated into a television, or digital video recorder (DVR). In other embodiments, computing system environment 10 may be incorporated into other devices, such as, but not limited to, a desktop computer, a laptop or notebook computer, a personal digital assistant (PDA), a mobile telephone, a global positioning system (GPS) device, a portable digital music device, or any other computing platform. For example, computing system environment 10 is shown as connecting to a monitor 30, upon which information may be displayed, and to a speaker 32, through which audio output may be played.

In some embodiments, computing system environment 10 may have access to remote or networked functionality, e.g., information retrievable from an intranet or the Internet, remote or networked storage devices, or additional computing or graphical rendering functionality. For example, computing system environment 10 is depicted as connecting to a remote database 40, from which information may be retrieved.

Computing Environment

Figure 1B:
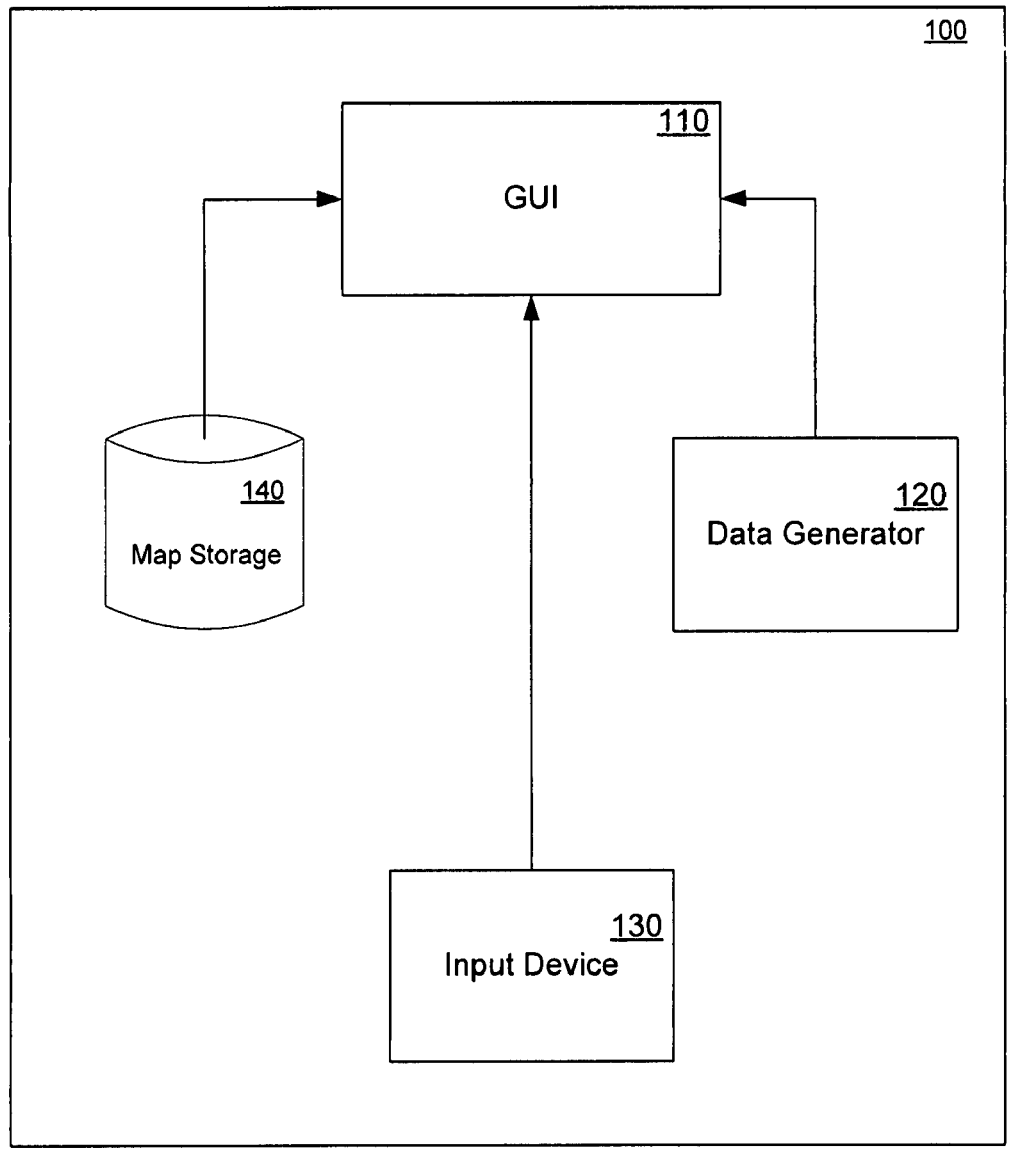
FIG. 1B is a block diagram of an exemplary computing environment, in accordance with one embodiment.

With reference now to FIG. 1B, a block diagram of a computing environment 100 is depicted, in accordance with one embodiment. While computing environment 100 is shown as incorporating specific, enumerated features, it is understood that embodiments are well suited to applications with additional, fewer, or different features and/or configurations.

Computing environment 100 is shown as including graphical user interface (GUI) 110. In the depicted embodiment, graphical user interface 110 is used for displaying information to a user of computing environment 100.

Computing environment 100 also includes input device 130. In the environment, input device 130 is used for providing input to GUI 110. Computing environment 100 is shown as including data generator 120. In the depicted environment, data generator 120 is used for accessing content, such as multimedia content with a geographic tag. Computing environment 100 also includes map storage 140. Map storage 140, in the depicted environment, could be a database or other data storage means for storing map information.

Graphical User Interface

Figure 2A:
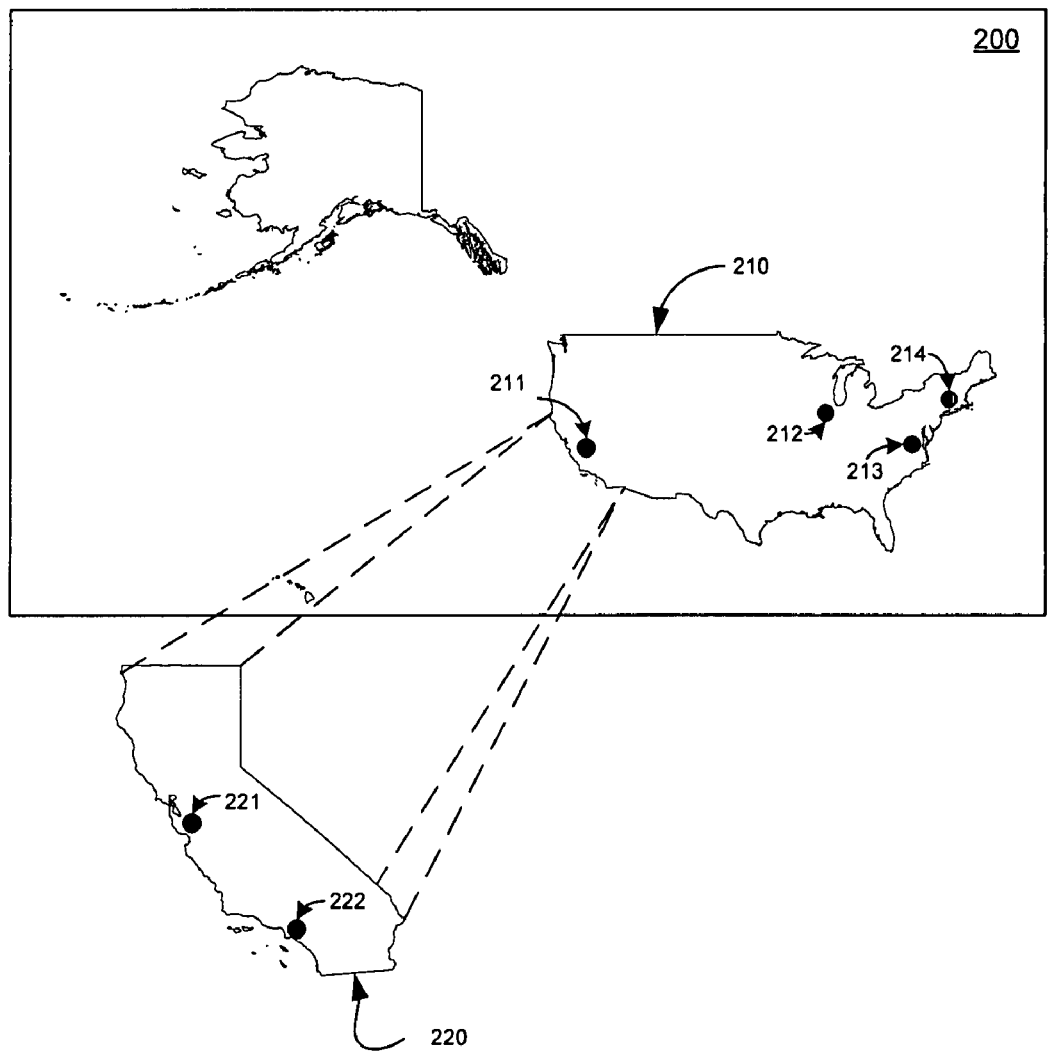
FIG. 2A is a representation of a graphical user interface, in accordance with one embodiment.

With reference now to FIG. 2A, a representation of a graphical user interface (GUI) 200 is depicted, in accordance with one embodiment. While GUI 200 is shown as incorporating specific, enumerated features, it is understood that such features are exemplary in nature; that is, GUI 200 could include additional, fewer, or different features. Embodiments are well suited to use with a wide variety of interfaces, both graphical and otherwise.

GUI 200 is shown as displaying a representation of the United States 210. Representation 210 shows a number of geographic points 211 through 214. In the depicted embodiment, these geographic points roughly correspond to the locations of several major cities. GUI 200 is also shown as displaying an exploded representation of the State of California 220. Representation 220, in the depicted embodiment, also shows a number of geographic points, namely points 221 and 222.

As explained in greater detail below, one embodiment allows for access to content by interaction with a geographic map. Content is associated, in some way, with a specific geographic point, e.g., a major US city. When this content is searched for or otherwise accessed by a user, they may be able to access different content by selecting from the geographic map, e.g., top news stories from various major cities may be accessible by first clicking on the desired cities on GUI 200.

Further, in some embodiments, a user of the embodiment shown in FIG. 2 may be able to access additional content by zooming in or out of the map. For example, by zooming in on the State of California, e.g. clicking on representation 210 in a particular manner could cause representation 220 to be displayed, a user may access content associated with several cities in California, whereas representation 210 only shows a single geographic point. Similarly, zooming out on GUI 200 may present an alternative interface, showing a larger part of the world, and make different content available, e.g., international news or news from various other countries.

Figure 2B:
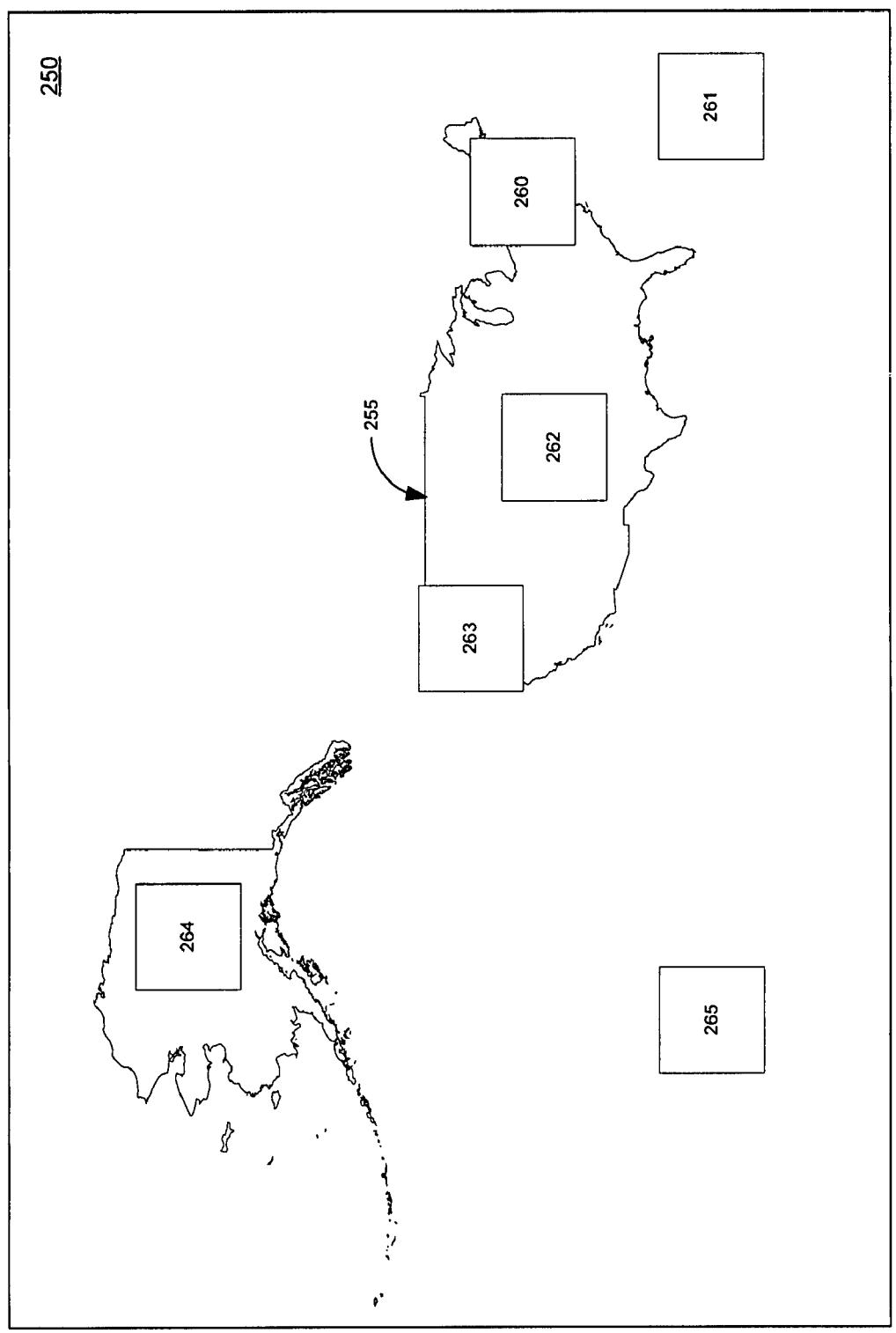
FIG. 2B is a representation of a graphical user interface, in accordance with one embodiment.

With reference now to FIG. 2B, a representation of a graphical user interface (GUI) 250 is depicted, in accordance with one embodiment. While GUI 250 is shown as incorporating specific, enumerated features, it is understood that such features are exemplary in nature; that is, GUI 250 could include additional, fewer, or different features. Embodiments are well suited to use with a wide variety of interfaces, both graphical and otherwise.

GUI 250 is shown as displaying a representation of the United States 255. GUI 250 is also shown as including several content windows 260 through 265. These content windows, in the depicted embodiment, are overlaid on top of representation 255.

As explained in greater detail below, one embodiment allows for access and/or viewing of content via a geographic map. As depicted in FIG. 2B, an embodiment can display content over top of the geographic map. For example, if a user were to access content relating to weather across North America, content windows 260 through 265 could be used to display small video clips of weather conditions in various portions of the country.

Presenting Geographically Linked Content

Figure 3:
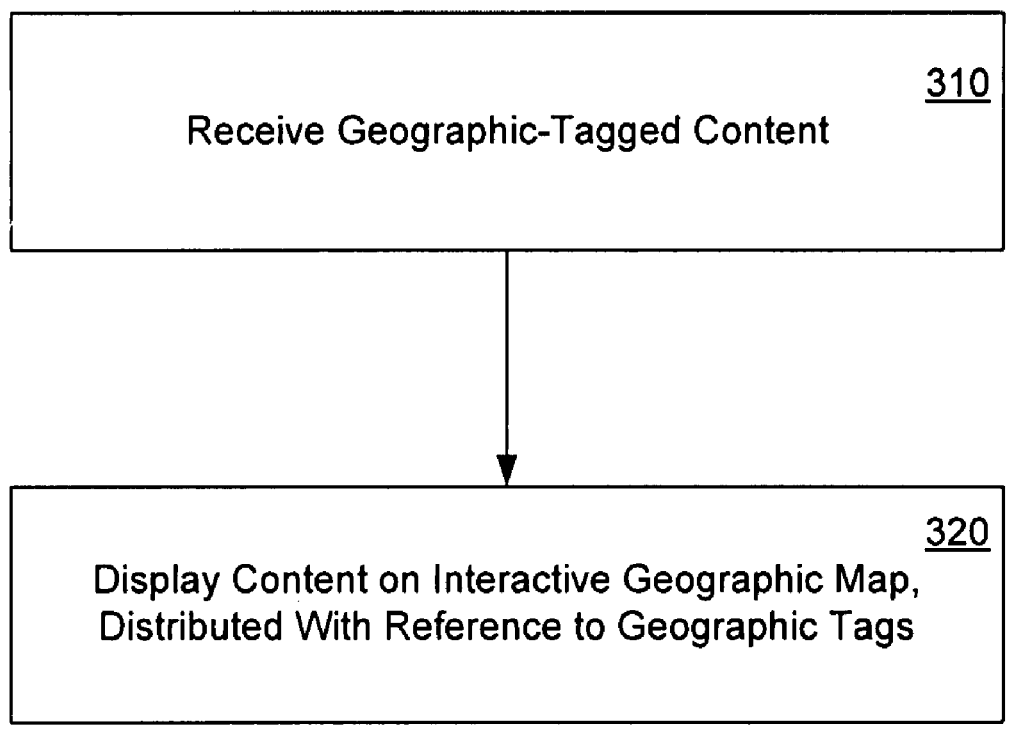
FIG. 3 is a flowchart of a method of presenting geographically linked content, in accordance with one embodiment.

With regard to FIG. 3, a flowchart 300 of a method of presenting geographically linked content is presented, in accordance with one embodiment. Although specific steps are disclosed in flowchart 300, such steps are exemplary. That is, embodiments of the present invention are well suited to performing various other (additional) steps or variations of the steps recited in flowchart 300. It is appreciated that the steps in flowchart 300 may be performed in an order different than presented, and that not all of the steps in flowchart 300 may be performed.

With regards to step 310, geographically tagged content is received. The source of this geographically tagged content will vary across different embodiments. For example, in one embodiment, this method may be performed with search results obtained from a traditional search engine. Similarly, the nature of the link between the content and geography will vary, across different embodiments. For example, in one embodiment, the author or originator of the content may select an appropriate geographic tag.

With respect to FIG. 1B, GUI 110 receives geographically linked content from data generator 120, in response to a query by a user input via input device 130.

With respect now to step 320, the geographically tagged content is displayed on an interactive geographic map, distributed with reference to the geographic tags. The implementation of this step will vary, across different embodiments. In some embodiments, for example, only access to the content will be displayed on the map. This is the scenario depicted in FIG. 2A: icons, thumbnails, or any other indicator of available content could be used, in combination with GUI 200, to both make available the content, and make the geographical association evident. In other embodiments, some or all of the available content could be displayed directly on, or on top of, the geographic map. This is the scenario depicted in FIG. 2B: a number of content "windows", or some other means, are used to both depict the content and to make the geographical link clear.

With reference to FIGS. 1B and 2A, GUI 110 retrieves one or more maps from map storage 140, as appropriate to the content received. The content is made available through interaction with the appropriate map, such as selecting geographic point 214 on representation 210 in order to access content associated with New York City.

Search System

Figure 4:
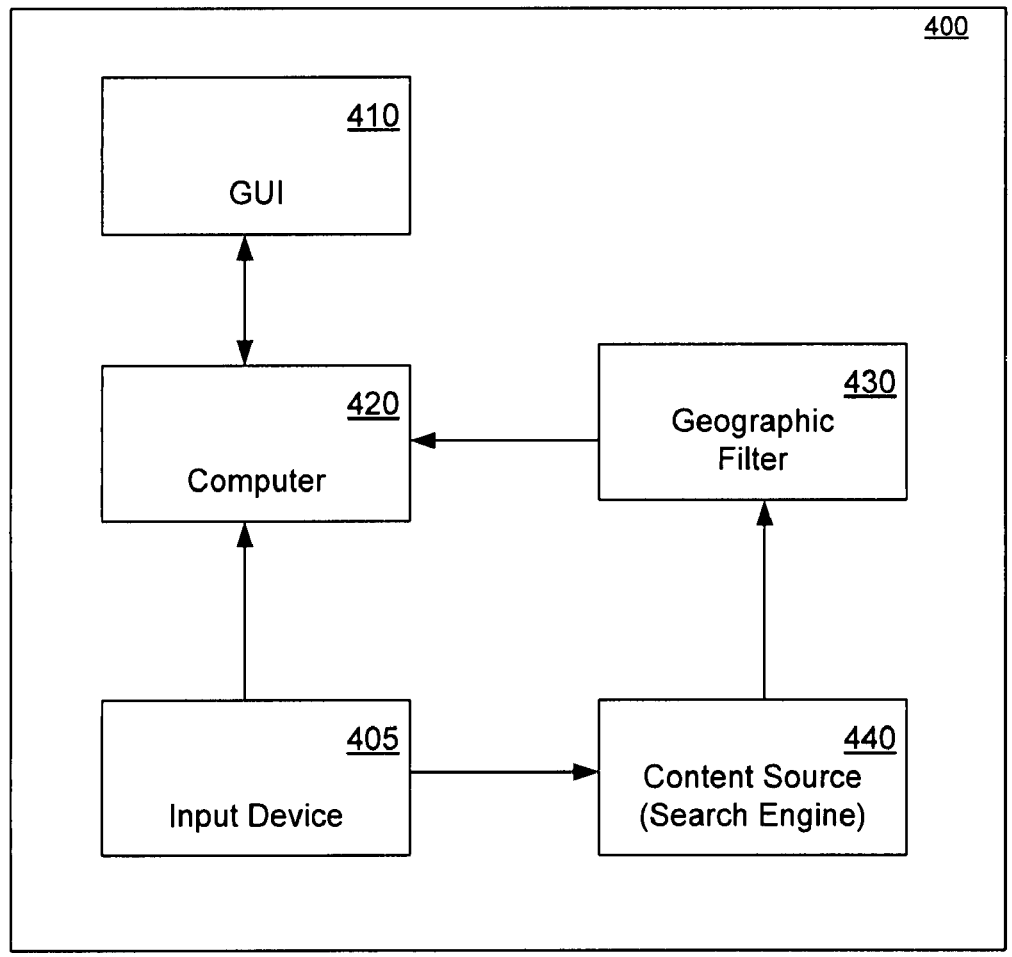
FIG. 4 is a block diagram of a search system, in accordance with one embodiment.

With reference now to FIG. 4, a block diagram of a search system 400 is depicted, in accordance with one embodiment. While search system 400 is shown as incorporating specific, enumerated features, it is understood that such features are exemplary in nature; that is, search system 400 could include additional, fewer, or different features. Embodiments are well suited to use with a wide variety of technology.

Search system 400 is shown as incorporating input device 405. Input device 405 will vary, across different embodiments. In some embodiments, for example, input device 405 could be a computer keyboard. In other embodiments, e.g., an embodiment incorporated into a media center, input device 405 could be a television remote control.

Search system 400 is depicted as including computer 420. The implementation of computer 420 will vary, across different embodiments. For example, computer 420 may be a desktop or laptop computer. Computer 420 could also be integrated into another device, such as a media center computer, or a television.

Search system 400 is also shown as including a graphical user interface (GUI) 410. Search system 400 includes, or has access to, content source 440. Content source 440 will vary, across different embodiments. In one embodiment, content source 440 could be a search engine or other search functionality operating on computer 420, searching through locally stored content. In another embodiment, content source 440 could be an interface to a remote search engine, or to a remote content storage. Further, multiple content sources 440 could be incorporated into the same search system 400. Search system 400 is also shown as including geographic filter 430.

The operation of search system 400 is explained in greater detail below.

Filtering Geographic Content

Figure 5:
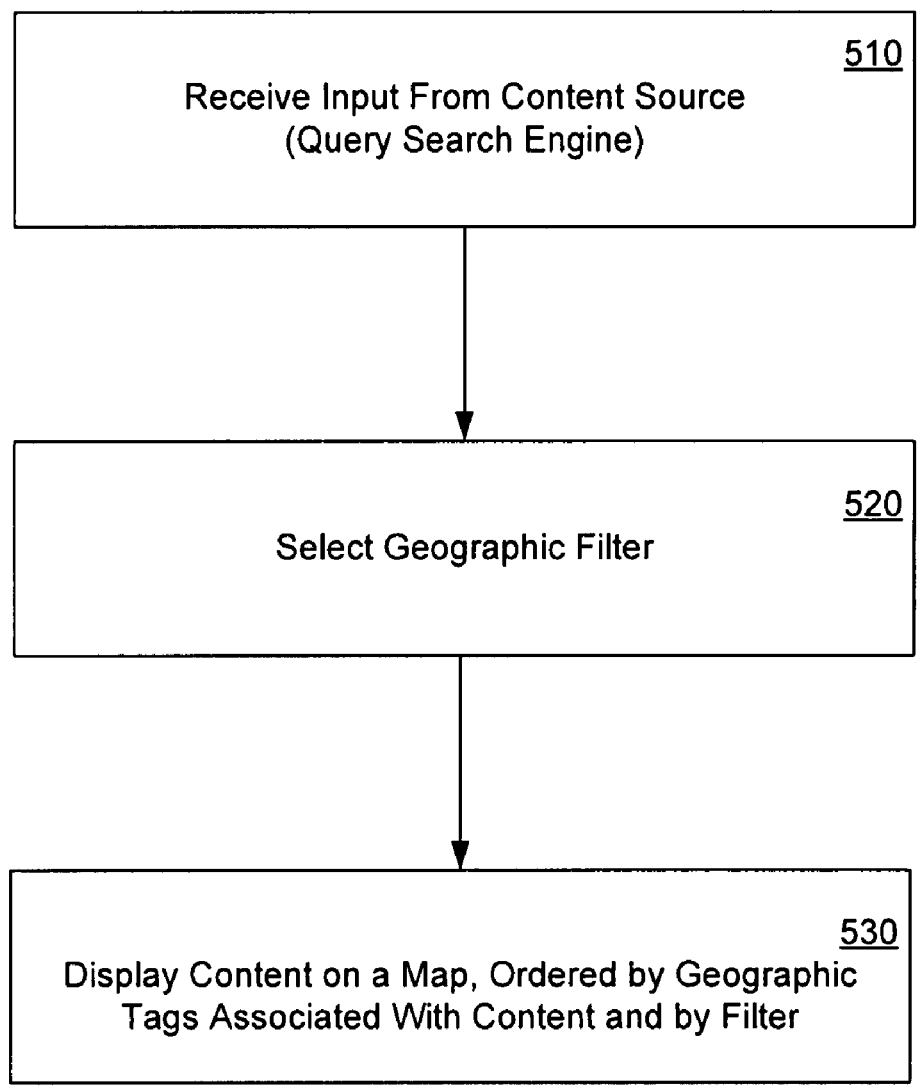
FIG. 5 is a flowchart 500 of a method of filtering available content by a geographic tag, in accordance with one embodiment.

With reference now to FIG. 5, a flowchart 500 of a method of filtering available content by a geographic tag is depicted, in accordance with one embodiment. Although specific steps are disclosed in flowchart 500, such steps are exemplary. That is, embodiments of the present invention are well suited to performing various other (additional) steps or variations of the steps recited in flowchart 500. It is appreciated that the steps in flowchart 500 may be performed in an order different than presented, and that not all of the steps in flowchart 500 may be performed.

With reference now to step 510, input is received from a content source. In different embodiments, this input will take different forms. In some embodiments, this input will have one or more geographic links associated with it; e.g., a video clip of a news broadcast originating in Los Angeles could include some metadata tag, indicating the origin of the clip. Similarly, the nature of the content source will vary, across different embodiments. In one embodiment, for example, the content source is a search engine, and the input represents search results from a search query. Such a query could originate from a user, e.g., the user enters a query, or selects from a list of available queries, and a search engine provides results.

For example, with reference to FIG. 4, input device 405, a keyboard, is used to query a content source 440, a search engine for searching video clips on a social networking site. Content source 440 produces a list of search results.

With reference now to step 520, a geographic filter is selected. In some embodiments, this geographic filter is used to modify the presentation of the input received from the content source. For example, if the input for a collection of video clips, the clips could have geographic links associated with where they were created, where they were most frequently watched, or where the subject matter of the clip is located. In such a scenario, geographic filters may exist to allow the input to be sorted or displayed by any of these geographic factors.

With reference to FIG. 4, a geographic filter 430 could be selected, in order to modify the presentation of the video clips returned by content source 440.

With reference now to step 530, the input is displayed on a map, according to the selected geographic filter and with geographic tags associated with the content. The nature of the displaying end of the map will vary, across different embodiments. For example, in one embodiment, content may be displayed over top of a map, such that one or more video clips, for example, may be played over top of the geographic regions from which the originate. In another example embodiment, the map may serve to provide access to the content, with icons or thumbnails or some other interactive feature displayed according to the geographic tag associated with the content and with the geographic filter selected. Such icons could then be used to access the content.

With reference to FIGS. 2 and 4, and continuing the preceding example, computer 420 uses GUI 410 to display the input received from content source 440, as filtered by geographic filter 430. In one embodiment, GUI 410 could appear similar to GUI 200, and the video clips, or links to video clips, returned by content source 440 could be sorted by the origin of the video file. Some or all of these video files, then, could be accessed by interacting with representation 210, e.g., clicking on geographic point 214 in order to access video clips that originated in New York City. In another embodiment, GUI could appear similar to GUI 250, and a few video clips could be played in the available content windows, with content window 260 displaying a clip that originated in New York, content window 263 displaying a clip that originated in Washington state, and the like.

Providing Access to Geographically Associated Content

Figure 6:
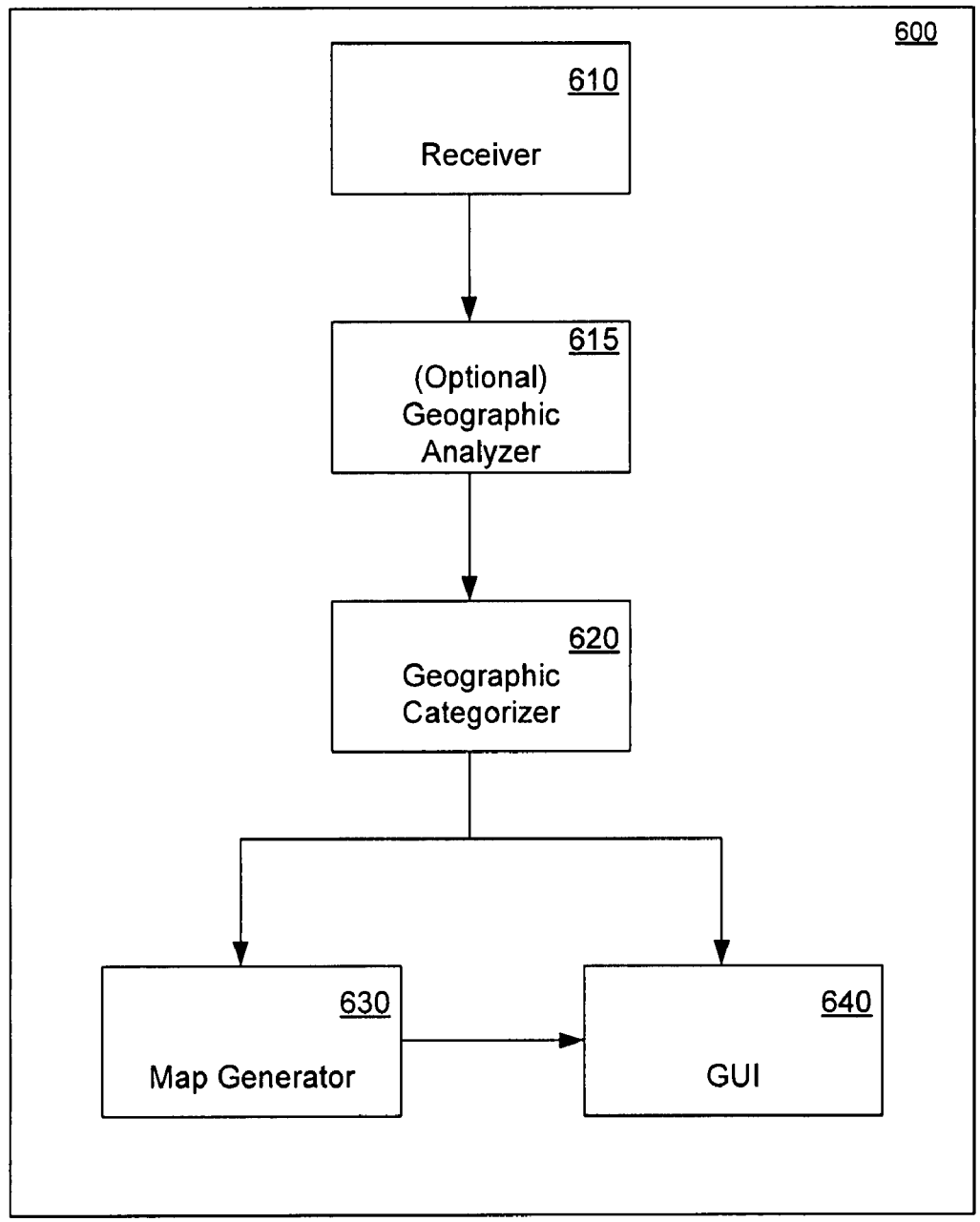
FIG. 6 is a block diagram of a system, in accordance with one embodiment.

With reference now FIG. 6, a block diagram of a system 600 is depicted, in accordance with one embodiment. While system 600 is shown as incorporating specific, enumerated features, it is understood that such features are exemplary in nature; that is, system 600 could include additional, fewer, or different features. Embodiments are well suited to use with a wide variety of technology.

System 600 is shown as incorporating receiver 610. System 600 is also shown as incorporating optional geographic analyzer 615. In the depicted embodiment, system 600 also includes geographic categories or 620. System 600, as shown, includes map generator 630. GUI 640 is also included in the depicted embodiment.

Figure 7:
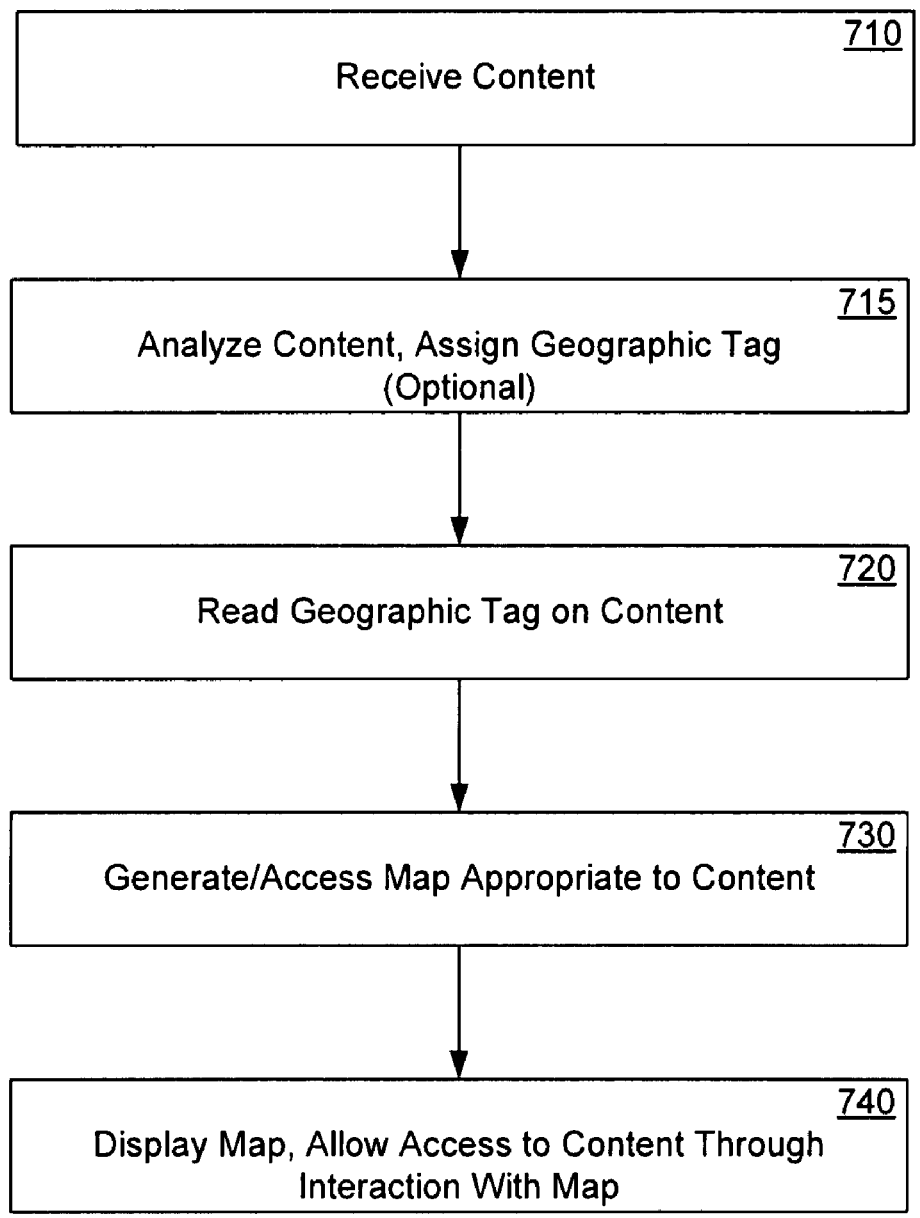
FIG. 7 is a flowchart of a method of providing access to content based on a geographic association, in accordance with one embodiment.

With reference now to FIG. 7, a flowchart 700 of a method of providing access to content based on a geographic association is presented, in accordance with one embodiment. Although specific steps are disclosed in flowchart 700, such steps are exemplary. That is, embodiments of the present invention are well suited to performing various other (additional) steps or variations of the steps recited in flowchart 700. It is appreciated that the steps in flowchart 700 may be performed in an order different than presented, and that not all of the steps in flowchart 700 may be performed.

With reference now to step 710, content is received. The nature of the received content will vary, across different embodiments, as will the source of the received content. In some embodiments, the content received will include data or metadata associated with the content, which will indicate some geographic link. In other embodiments, no such geographic link will be received. In other embodiments, some portion of the received content may include such links.

For example, with reference to FIG. 6, receiver 610 receives content. Content could originate from a variety of sources, and be of a variety of different natures.

With reference now to step 715, the received content is analyzed, and a geographic tag is assigned to the content. In some embodiments which include the step, the content can be evaluated, in order to establish some geographic link or information, with respect to that content. For example, text or audio content could be evaluated, in order to attempt to determine what language is used predominantly within the content. As an additional example, the geographic origin of some content can be determined, based on other available data, e.g., IP addresses. Some embodiments omit the step.

For example, with reference to FIG. 6, geographic analyzer 615 examines the content received by receiver 610, and attempts to assign one or more geographic tags to the content.

With reference now to step 720, one or more geographic tags associated with the content are examined. In some embodiments, such as some of those which include step 715, the geographic tags associated with the content may already be known. In other embodiments, some data or metadata tag, or other means of indicating geographic data associated with content, are examined.

For example, with reference to FIG. 6, geographic categorizer 620 examines the content received by receiver 610, and reads any geographic tags associated with the content, or that may have been created by geographic analyzer 615.

With reference now to step 730, an appropriate geographic map is selected for the content. In some embodiments, this process involves using the geographic tags for the content to select maps appropriate for that content. In some embodiments, one or more appropriate maps may be retrieved from a storage device. In some embodiments, one or more maps may be freshly generated. In some embodiments, a combination of these approaches is utilized. In other embodiments, other methods of accessing or generating a map may be utilized.

For example, with reference to FIG. 6, map generator 630 uses the geographic tags read by geographic categorizer 620 in order to generate an appropriate map for that content.

With reference now to step 740, the map is displayed, and allows access to the content through interaction. In some embodiments, an approach similar to the described behavior of GUI 200 is utilized, with access to the content available through interactive icons displayed on top of the map. In other embodiments, an approach similar to the described behavior of GUI 250 is utilized, with some or all of the content laid on top of geographic the appropriate portions of the map. In other embodiments, different approaches to both map display and content interaction are utilized.

For example, with reference to FIG. 6, GUI 640 displays the map created by map generator 630, with the content overlaid on the map in geographically appropriate locations, as indicated by the geographic tags read by geographic categorizer 620.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of displaying multimedia content, comprising:
   receiving said multimedia content, wherein said multimedia content comprises a geographic tag;
   displaying a geographic map, wherein said geographic map is configured by a processor to allow access to a portion of said multimedia content, and wherein said displaying comprises displaying said portion of said multimedia content over top of said geographic map; and
   selecting said geographic map with reference to said geographic tag.

2. The method of claim 1, wherein said displaying further comprises providing an interactive region on said geographic map to allow access to said portion of said multimedia content.

3. The method of claim 2, wherein said interactive region is positioned with reference to said geographic tag.

4. The method of claim 1, wherein said displayed portion of said multimedia content is positioned with reference to said geographic tag.

5. The method of claim 1, further comprising:
   altering said displaying of said geographic map to allow zooming functionality.

6. The method of claim 1, further comprising:
   receiving a plurality of multimedia content, wherein said plurality of multimedia content comprises a plurality of geographic tags; and
   selecting said geographic map with reference to said plurality of geographic tags.

7. A system for displaying multimedia content, comprising:
   a receiver, for receiving said multimedia content;
   a geographic categorizer, for examining a geographic tag associated with said multimedia content;
   a map generator, for selecting a geographic map with reference to said geographic tag; and
   a graphical user interface (GUI), for displaying said geographic map and for allowing said geographic map to be used to access said multimedia content.

8. The system of claim 7, further comprising:
   a geographic analyzer, for examining said multimedia content and associating said geographic tag with said multimedia content.

9. The system of claim 8, wherein said geographic analyzer is configured to determine a language used in said multimedia content.

10. The system of claim 8, wherein said geographic analyzer is configured to determine a geographic origin associated with said multimedia content.

11. The system of claim 7, wherein said map generator is configured to generate said geographic map.

12. The system of claim 7, wherein said multimedia content comprises digital video data.

13. The system of claim 7, wherein said geographic tag comprises a location associated with a topic of said multimedia content.

14. A computer-readable medium having computer-executable instructions for performing steps comprising:
   receiving an input from a content source, said input comprising a geographic tag;
   selecting a geographic filter; and
   displaying a representation of said input on a geographic map, wherein said representation is positioned on said geographic map with reference to said geographic tag and said geographic filter.

15. The computer-readable medium of claim 14, wherein said geographic tag comprises an origin of said input.

16. The computer-readable medium of claim 14, wherein said geographic tag comprises a country associated with a language used in said input.

17. The computer-readable medium of claim 14, wherein said representation of said input comprises an interactive region of said geographic map, said interactive region operable to provide access to said input.

18. The computer-readable medium of claim 14, wherein said content source comprises a search engine.

* * * * *